(No Model.)
E. W. RICE, Jr.
TRANSFER SYSTEM OF ELECTRIC DISTRIBUTION.
No. 400,486. Patented Apr. 2, 1889.
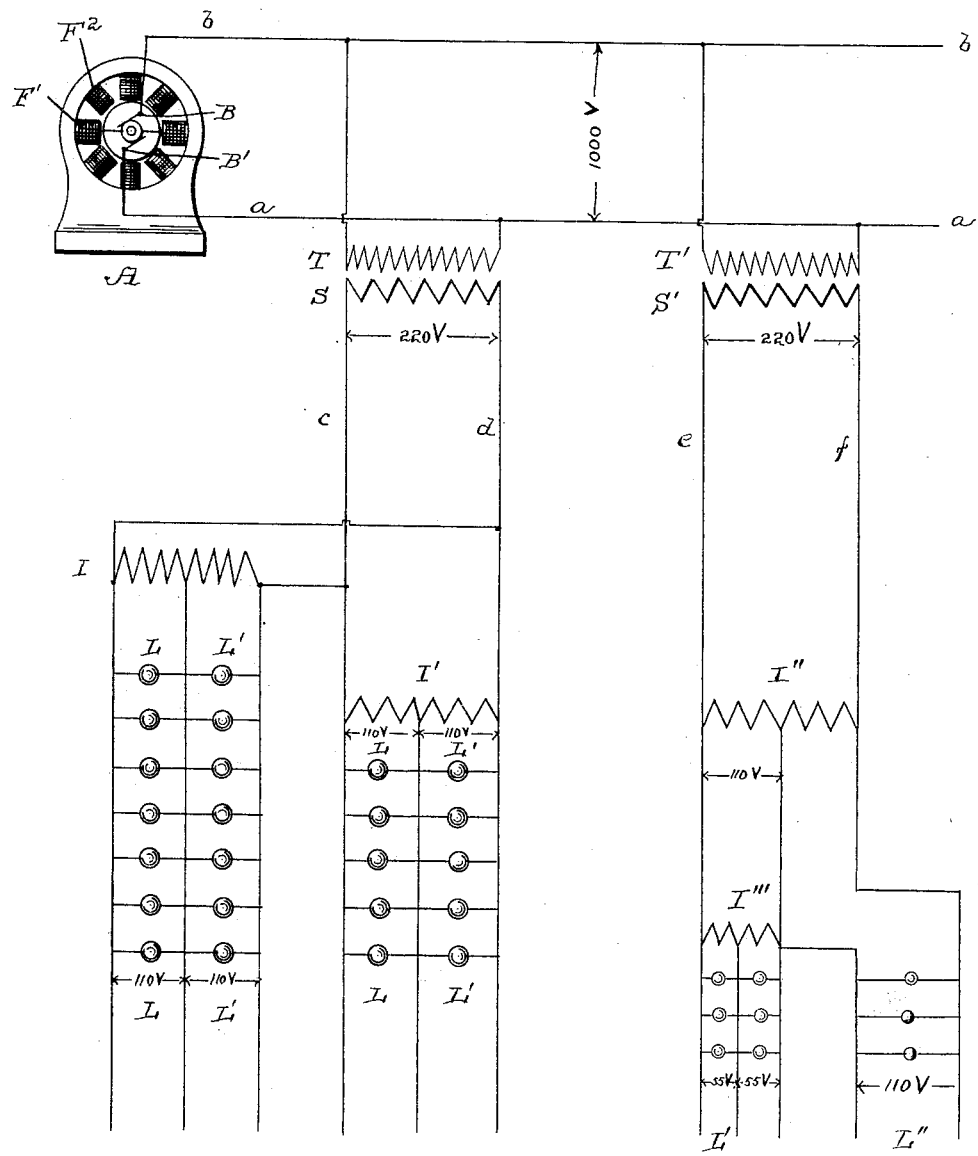
Witnesses
Ira R. Steward
[signature]
Inventor.
Edwin Wilbur Rice, Jr.
By his Attorney
H. C. Townsend

UNITED STATES PATENT OFFICE.

EDWIN WILBUR RICE, JR., OF LYNN, MASSACHUSETTS.

TRANSFER SYSTEM OF ELECTRIC DISTRIBUTION.

SPECIFICATION forming part of Letters Patent No. 400,486, dated April 2, 1889.

Application filed October 31, 1888. Serial No. 289,683. (No model.)

*To all whom it may concern:*

Be it known that I, EDWIN WILBUR RICE, Jr., a citizen of the United States, and a resident of Lynn, in the county of Essex and State of Massachusetts, have invented a certain new and useful Induction Transfer System of Electric Distribution, of which the following is a specification.

My present invention relates to a system of electric distribution by means of alternating currents in which high-potential currents from a generator are carried by a line to converters or transformers and are there changed to currents of lower electro-motive force and greater volume.

My invention consists in the system of electric distribution hereinafter described and comprising alternating-current mains leading from a point of alternating-current supply, converters or transformers of the ordinary description connected to said mains at any convenient or desired points, leading wires or mains connected to the secondaries of said converters, one or more induction transfer-coils connected across said mains, and three or more sub-circuits or distributing-wires connected to the transfer-coils, each two sub-circuits having a fraction of the transfer-coil included between them, after the principle of United States Patent No. 360,125. The sub-circuits or distributing-wires running out from the transfer-coils may supply incandescent lamps or other translating devices connected between pairs of wires, or may include other transfer-coils, to which in turn the translating devices may connect by wires, including a fraction of the winding of each coil, the subdivision of the circuits being carried out by means of the transfer-coils to any desired extent and the circuit subdivided on the final transfer-coil supplying the translating devices, such as lamps.

In the figure, A represents an alternating-current dynamo-generator, of which F' F², &c., are the field-poles, excited, it may be, from any external source, or by a separate winding on its own armature B B', the brushes bearing on the collector-rings, and $a\ b$ the mains, leading to the translating devices situated on the external circuit. Such current-using devices are represented at T T', which are converters or transformers of any pattern for reducing the high-potential current on the mains $a\ b$ to low-potential currents of large volume in the secondary lines $c\ d$ and $e\ f$.

Connected in multiple across the mains $c\ d$ and $e\ f$, &c., are a number of induction transfer-coils, I I' I², &c., with lamps L L', &c., supplied therefrom. The coils I I' I², &c., are not transformers in the usual sense of the term, but are properly equalizers for potential difference existing on different lamp-circuits leading from and supplied by current by the coils I I', &c. Thus, should lamps be extinguished in the circuit L, the full number running in the circuit L', both being supplied with current from the same coil, the lesser number of lamps will tend to run at an increased brilliancy; but the action of the coil I now asserts itself to equalize the difference of potential in the different branches fed by the coil, in accordance with the principles described in a patent to Elihu Thomson, No. 360,125.

By my invention I secure greater flexibility of distribution with greater economy than is at present obtained by the use of either transformers or induction transfer-coils alone. This is indicated in the figure where a current with as high a potential as one thousand volts may exist between the primary mains $a\ b$, leading from the alternating-current generator A, which current, when it reaches the transformers T T', &c., is converted into a current having a potential of, say, two hundred and twenty volts on the secondary mains $c\ d\ e\ f$. This current is in turn fed to induction transfer-coils I I' I², &c., from which coils lamps, motors, or other electric apparatus suitable for use with alternating-currents may be supplied with currents of any desired potential as great as or lower than two hundred and twenty volts without further conversion. Suitable fuses for safety in cases of short circuits, &c., should be placed in the mains leading to and from the transformers T T', and in the circuits leading to and from the induction transfer-coils I I', &c., as usual.

It will be understood from the foregoing that the subdivision of potential may be carried even to a further extent than is indicated in the drawing, it being only necessary to extend the principle of supplying transfer-coils from fractions of preceding transfer-coils in the trains of subdivision of potential, and from the final coil to supply the translating devices.

It will further be seen from the diagram that the subdivision indicated may be carried out, as at $I^3$, through the wires leading from one fraction of the first coil, $I^2$, of the series, leaving the other fraction or fractions for the supply of currents of higher potential to translating devices, or that the subdivision may be carried out through all the wires connected to the first coil of the system and may stop at different points in the trains of subdivision.

What I claim as my invention is—

1. The herein-described system of electrical distribution, comprising alternating-current mains leading from a point of alternating-current supply, one or more converters or transformers of the ordinary description connected to said mains, leading wires or mains connected with the secondaries of said converters, and one or more induction transfer-coils connected across said leading wires and having connected with them two or more sub-circuits or distributing-wires, each two sub-circuits having a fraction of the transfer-coil included between them, as and for the purpose described.

2. The herein-described system of alternating-current distribution, comprising alternating-current mains leading from a suitable source of current-supply, converters or transformers connected in multiple across said mains, leading wires or mains connected to the secondaries of said converters, induction transfer-coils connected across said leading wires, and sub-circuits or distributing-wires leading from and including a fraction of said transfer-coils, said leading-wires supplying current to still other transfer-coils for the purpose of still further subdividing the potential, as and for the purpose described.

3. In an alternating-current system of distribution, the combination, with suitable transformers, of a system of induction transfer-coils supplied from the secondaries thereof, and other transfer-coils of smaller size supplied by wires, including a fraction only of the first-named coils, the subdivision of circuits and transfer-coils being carried to any desired extent, for the purpose of subdividing the potential.

Signed at Lynn, in the county of Essex and State of Massachusetts, this 26th day of October, A. D. 1888.

EDWIN WILBUR RICE, JR.

Witnesses:
  J. W. GIBBONEY,
  ELIHU THOMSON.